(12) United States Patent
Matsumoto

(10) Patent No.: US 12,190,771 B2
(45) Date of Patent: Jan. 7, 2025

(54) DISPLAY SYSTEM AND DISPLAY METHOD

(71) Applicant: JVCKENWOOD Corporation, Yokohama (JP)

(72) Inventor: Eiji Matsumoto, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/475,284

(22) Filed: Sep. 27, 2023

(65) Prior Publication Data

US 2024/0112608 A1  Apr. 4, 2024

(30) Foreign Application Priority Data

Sep. 27, 2022 (JP) ................ 2022-153292
Sep. 27, 2022 (JP) ................ 2022-153293

(51) Int. Cl.
*G09G 3/20* (2006.01)

(52) U.S. Cl.
CPC ....... *G09G 3/20* (2013.01); *G09G 2320/0233* (2013.01); *G09G 2330/027* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 10,055,887 B1* | 8/2018 | Gil | ............ | G06F 1/163 |
| 10,474,230 B2* | 11/2019 | Lemoff | ............ | G06G 3/10 |
| 2008/0111830 A1* | 5/2008 | Liu | ............ | G06F 1/3218 |
| | | | | 345/619 |
| 2011/0032268 A1* | 2/2011 | Takei | ............ | H04N 1/00442 |
| | | | | 345/589 |
| 2016/0293139 A1* | 10/2016 | Kwon | ............ | G06F 3/03547 |
| 2018/0181162 A1* | 6/2018 | Wu | ............ | G02B 27/0172 |
| 2019/0172264 A1* | 6/2019 | Oh | ............ | G06F 3/0304 |
| 2020/0098335 A1* | 3/2020 | Chen | ............ | G09G 5/10 |
| 2021/0282639 A1* | 9/2021 | Yokoyama | ............ | G02B 27/02 |
| 2022/0206299 A1* | 6/2022 | Macken | ............ | G09G 5/10 |
| 2022/0217325 A1* | 7/2022 | Lee | ............ | G06V 40/19 |

FOREIGN PATENT DOCUMENTS

| | | | |
|---|---|---|---|
| CN | 104715736 A | * | 6/2015 |
| CN | 115100708 A | * | 9/2022 |
| JP | 2003-076353 A | | 3/2003 |
| KR | 20120026771 A | * | 3/2012 |
| KR | 20190066427 A | * | 6/2019 |
| WO | WO-2023152852 A1 | * | 8/2023 |

* cited by examiner

*Primary Examiner* — Patrick N Edouard
*Assistant Examiner* — Peijie Shen
(74) *Attorney, Agent, or Firm* — Shih IP Law Group, PLLC

(57) ABSTRACT

A display system includes: a display unit that is provided inside a housing mounted on a user's head and that displays an image to the user; a termination detection unit that detects termination of display by the display unit; and an adaptation display determination unit that determines, according to the elapsed time from start to end of display by the display unit, an adaptation display pattern that reduces a difference between an internal illuminance value indicating a brightness inside the housing and an external illuminance value indicating a brightness outside the housing by changing a brightness of the image displayed on the display unit.

10 Claims, 7 Drawing Sheets

FIG. 3

|  | AGE a | | |
| --- | --- | --- | --- |
|  | FIRST RANGE (a<30) | SECOND RANGE (30≦a<50) | THIRD RANGE (50≦a) |
| DISPLAY TIME (ADDITION VALUE) | 0 SECONDS | 5 SECONDS | 10 SECONDS |

FIG. 4

|  | ELAPSED TIME b (h) | | |
| --- | --- | --- | --- |
|  | FIRST RANGE (b<1) | SECOND RANGE (1≦b<2) | THIRD RANGE (2≦b) |
| DISPLAY TIME (ADDITION VALUE) | 0 SECONDS | 5 SECONDS | 10 SECONDS |

FIG. 5

|  | ILLUMINANCE DIFFERENCE c | | |
| --- | --- | --- | --- |
|  | FIRST RANGE (c<c1) | SECOND RANGE (c1≦c<c2) | THIRD RANGE (c2≦c) |
| DISPLAY TIME (MULTIPLICATION VALUE) | 0.8 | 1 | 1.2 |

ADJUSTING TO THE BRIGHTNESS OF
THE EXTERNAL ENVIRONMENT.
PLEASE WAIT FOR A WHILE.

40%

DISPLAY SYSTEM AND DISPLAY METHOD

CROSS REFERENCE TO RELATED APPLICATION

This application claims the benefit of priority from the prior Japanese Patent Application No. 2022-153292, filed on Sep. 27, 2022 and Japanese Patent Application No. 2022-153293, filed on Sep. 27, 2022, the entire contents of which are incorporated herein by reference.

BACKGROUND

1. Field of the Invention

The present invention relates to a display system and a display method.

2. Description of the Related Art

A head-mounted display mounted on the user's head is known as a form of display system. In order to reduce eye strain caused by using a head-mounted display continuously for a long time, techniques of reducing contrast or increasing brightness with an elapse of display time of images have been proposed (see, for example, Patent literature 1).

[Patent Literature 1] JP2003-76353A

In the case of a head-mounted display apparatus configured to shield external light, the brightness inside the apparatus perceived by the user exposed to the brightness of the image displayed when the apparatus is used is independent of the brightness of the environment outside the apparatus. When the use of the apparatus is terminated and the apparatus is removed, therefore, the difference between the internal and external brightness of the apparatus may be large. In this case, it takes time for the user to get used to the brightness of the environment outside the apparatus, which puts a strain on the user's eyes.

SUMMARY

A display system according to an embodiment includes: a display unit that is provided inside a housing mounted on a user's head and that displays an image to the user; a termination detection unit that detects termination of display by the display unit; and an adaptation display determination unit that determines an adaptation display pattern that reduces a difference between an internal illuminance value indicating brightness inside the housing and an external illuminance value indicating brightness outside the housing by changing brightness of the image displayed on the display unit.

Another embodiment relates to a display method. The method includes: displaying an image on a display unit provided inside a housing mounted on a user's head; measuring an elapsed time from start of display by the display unit; detecting termination of display by the display unit; determining an adaptation display pattern that reduces a difference between an internal illuminance value indicating a brightness inside the housing and an external illuminance value indicating a brightness outside the housing by changing a brightness of the image displayed on the display unit.

Optional combinations of the aforementioned constituting elements, and mutual substitution of constituting elements and implementations of the present embodiment between methods, apparatuses, systems, etc. may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 is a table showing an example of the display time determined according to the age;

FIG. 4 is a table showing an example of the display time determined according to the elapsed time;

FIG. 5 is a table showing an example of the display time determined according to the illuminance difference between the internal illuminance value and the external illuminance value;

DETAILED DESCRIPTION

Figure 1:
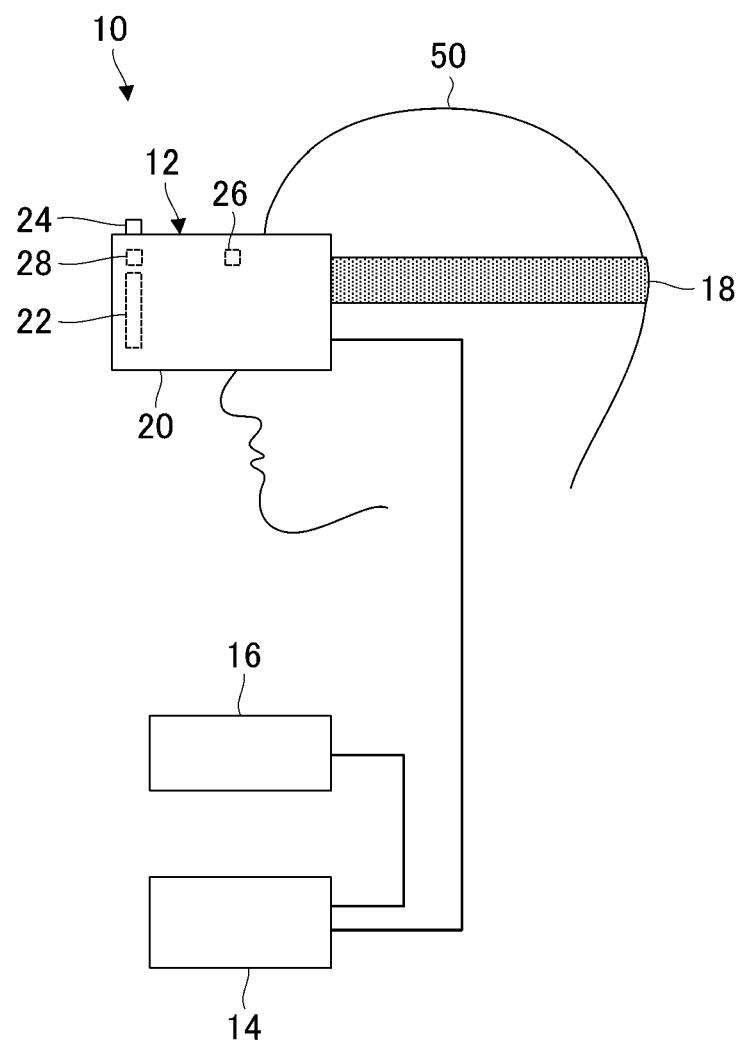
FIG. 1 shows a schematic configuration of a display system according to the embodiment.

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the drawings not directly relevant to the invention are omitted from the illustration.

FIG. 1 shows a schematic configuration of a display system 10 according to the embodiment. The display system 10 includes a display apparatus 12, a control apparatus 14, and an input apparatus 16.

The display apparatus 12 is a so-called head-mounted display and is mounted on the head of a user 50. The display apparatus 12 is fixed to the head of the user 50 by a fixture 18 such as a banding band. The display apparatus 12 includes a housing 20, a display unit 22, an external illuminance sensor 24, an internal illuminance sensor 26, and an internal camera 28.

The housing 20 is mounted on the head of the user 50 so as to cover both eyes of the user 50. The housing 20 has, for example, a goggle shape that covers the entire eyes of the user 50. The housing 20 is configured to shield external light, and the inside of the housing 20 becomes dark when the image is not displayed on the display unit 22.

The display unit 22 is provided inside the housing 20 and displays an image directed to the user 50. The display unit 22 includes, for example, an image display element disposed at a position facing the eyes of the user 50. As an image display element, a liquid crystal display (LCD; Liquid Crystal Display) or an Organic Electroluminescence Display (OELD; Organic Electro Luminescence Display) can be used. The display unit 22 may be a projection type display apparatus and may be configured as a projector or the like that projects image display light toward a display surface viewable by the user 50.

The external illuminance sensor 24 is provided outside the housing 20. The external illuminance sensor 24 measures the brightness outside the housing 20 and outputs an external illuminance value indicating the brightness outside the housing 20. The external illuminance sensor 24 is, for example, a sensor having a photodiode that detects the brightness of visible light and is configured to output an illuminance value indicating the brightness of visible light incident on the photodiode.

The internal illuminance sensor 26 is provided inside the housing 20. The internal illuminance sensor 26 measures the brightness inside the housing 20 and outputs an internal illuminance value indicating the brightness inside the housing 20. The internal illuminance sensor 26 is, for example, a sensor having a photodiode that detects the brightness of visible light and is configured to output an illuminance value indicating the brightness of visible light incident on the photodiode.

The internal camera 28 is provided inside the housing 20. The internal camera 28 is disposed so that at least one of the eyes of the user 50 can be imaged and is, for example, disposed at a position facing at least one of the eyes of the user 50. The internal camera 28 includes, for example, a light source that radiates infrared illumination light toward the user 50 and an imaging device that images at least one of the eyes of the user 50 with infrared light. As the light source, a semiconductor light emitting element such as an LED (Light Emitting Diode) can be used. As the imaging device, a two-dimensional image sensor such as a CCD (Charge Coupled Device) and a CMOS (Complementary Metal Oxide Semiconductor) can be used.

The control apparatus 14 controls the overall operation of the display apparatus 12. The control apparatus 14 is implemented, in hardware, by devices and mechanical apparatus exemplified by a processor such as a CPU (Central Processing Unit) and a memory such as a ROM (Read Only Memory) and a RAM (Random Access Memory) of a computer and, in software, by a computer program, etc.

The control apparatus 14 may be a dedicated terminal for controlling the operation of the display apparatus 12 or may be a mobile terminal such as a smartphone owned by the user 50. The control apparatus 14 may be configured to communicate by wire with the display apparatus 12 via a communication cable or may be configured to communicate wirelessly with the display apparatus 12. In the example of FIG. 1, the control apparatus 14 is depicted as being separate from the display apparatus 12, but the control apparatus 14 may be integrated with the display apparatus 12. In the case the control apparatus 14 is a mobile terminal such as a smartphone, for example, the display screen of the smartphone may function as the display unit 22. Further, at least some of the functions of the control apparatus 14 may be integrated with the display apparatus 12, and at least some of the functions of the control apparatus 14 may be implemented by a server apparatus installed away from the user 50.

The input apparatus 16 is an apparatus that receives an input operation from the user 50. The input apparatus 16 is, for example, a joystick or gamepad configured to be gripped and used by the user 50 wearing the display apparatus 12. The input apparatus 16 may be a mouse or a keyboard. The input apparatus 16 may be a microphone that receives an audio input from the user 50. When the input apparatus 16 is a microphone, a microphone may be provided in the display apparatus 12. For example, a microphone may be provided outside the housing 20.

Figure 2:
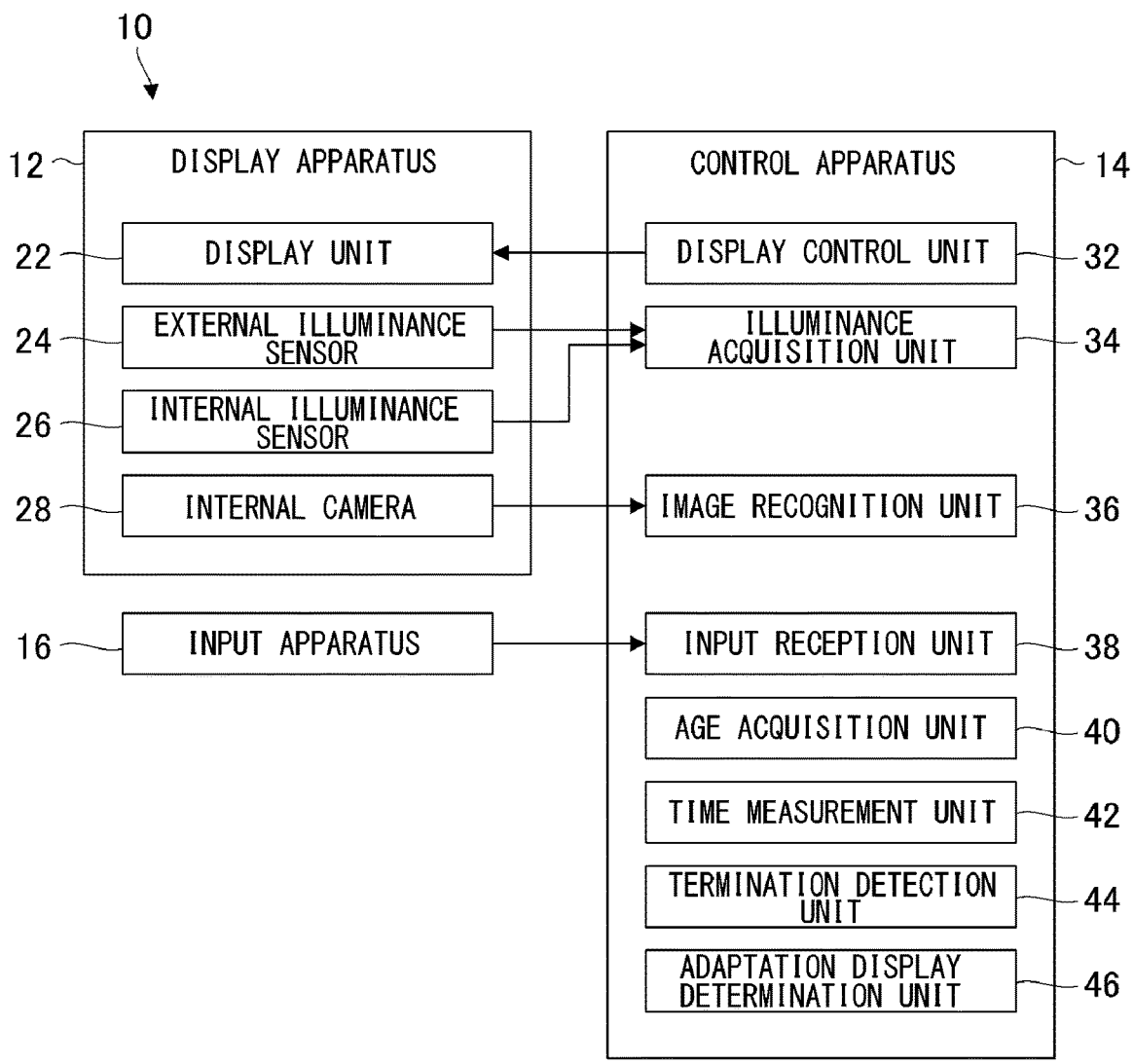
FIG. 2 is a block diagram schematically showing a functional configuration of the display system according to the embodiment.

FIG. 2 is a block diagram schematically showing a functional configuration of the display system 10 according to the embodiment. As described above, the display apparatus 12 includes a display unit 22, an external illuminance sensor 24, an internal illuminance sensor 26, and an internal camera 28. The control apparatus 14 includes a display control unit 32, an illuminance acquisition unit 34, an image recognition unit 36, an input reception unit 38, an age acquisition unit 40, a time measurement unit 42, a termination detection unit 44, and an adaptation display determination unit 46.

The display control unit 32 generates an image displayed on the display unit 22 and controls the operation of the display unit 22 based on the generated image. The display control unit 32 generates, for example, an image for providing a virtual reality to the user 50 and generates an image corresponding to the input operation of the user 50. The display control unit 32 may generate an image based on data acquired from any external apparatus (not shown). For example, the display control unit 32 may generate an image based on moving image data for playing back moving image content such as movies or animation.

At the termination of display by the display unit 22, the display control unit 32 displays an image according to an adaptation display pattern determined by the adaptation display determination unit 46. The adaptation display pattern defines a pattern for changing the brightness of the image displayed on the display unit 22 over time and, for example, defines a pattern for monotonically increasing or decreasing the brightness of the image over time. The display control unit 32 prevents a sudden change in brightness when the user 50 removes the display apparatus 12, by displaying an image according to the adaptation display pattern on the display unit 22. Details of the adaptation display pattern will be described later separately.

The illuminance acquisition unit 34 acquires an external illuminance value measured by the external illuminance sensor 24 and an internal illuminance value measured by the internal illuminance sensor 26. Instead of acquiring an internal illuminance value from the internal illuminance sensor 26, the illuminance acquisition unit 34 may acquire an internal illuminance value by calculating an internal illuminance value based on the brightness of the image displayed on the display unit 22. The illuminance acquisition unit 34 can calculate the internal illuminance value using, for example, a mathematical formula or table that associates the brightness of the image generated by the display control unit 32 with the internal illuminance value. The mathematical formula or table can be determined by, for example, measuring the brightness inside the housing 20 in advance when an image having a predetermined brightness is displayed on the display unit 22. In this case, the display apparatus 12 may not include an internal illuminance sensor 26. The illuminance acquisition unit 34 may acquire an internal illuminance value based on the luminance of the image displayed on the display unit 22.

The image recognition unit 36 acquires an image captured by the internal camera 28 and analyzes the acquired image using an image recognition technique. The image recognition unit 36 estimates, for example, the gaze direction of the user 50 from an image that includes at least one of the eyes of the user 50. The image recognition unit 36 may estimate the age of the user 50 from an image that includes at least one of the eyes of the user 50. When the image recognition unit 36 does not estimate the gaze direction or age, the display apparatus 12 may not include the internal camera 28, and the control apparatus 14 may not include the image recognition unit 36.

The input reception unit 38 acquires information indicating the input operation input to the input apparatus 16. The input reception unit 38 receives, for example, an input operation for inputting the user's own age by the user 50. The display control unit 32 may generate an operation screen for an input operation by the user 50 and display it on the display unit 22. The input reception unit 38 may receive a gaze input by the user 50 using the gaze direction of the user 50 estimated by the image recognition unit 36. The input reception unit 38 may receive an audio input by the user 50 using an audio signal from the microphone.

The age acquisition unit 40 acquires a value related to the age of the user 50. The age acquisition unit 40 may acquire the age of the user 50 estimated by the image recognition unit 36 or may acquire the age of the user 50 received by the input reception unit 38. The age acquisition unit 40 may acquire the numerical value of the age of the user 50 itself or may acquire a value indicating which range the age of the user 50 falls under. Given, for example, under 30 years old is defined as the first stage, 30 years old or over and under 50 years old as the second range, and 50 years old and over as the third range, the age acquisition unit 40 may acquire one of values 1, 2, and 3 corresponding to the first, second, and third range.

The time measurement unit 42 measures the hour of use for which the display apparatus 12 is used by the user 50. The time measurement unit 42 measures the time elapsed from the start of display by the display unit 22 as the hour of use. The start of display by the display unit 22 may be the point of time when the power of the display apparatus 12 is turned on or the point of time when some image or moving image content is displayed on the display unit 22 after the power is turned on. The elapsed time measured by the time measurement unit 42 may match the playback time of the moving image content.

The termination detection unit 44 detects that the user 50 has terminated the use of the display apparatus 12. The termination detection unit 44 detects the termination of display by the display unit 22. The termination detection unit 44 can detect the termination of display based on the input operation by the user 50 and, for example, detects the termination of display when an input operation to turn off the power of the display apparatus 12 is performed. The termination detection unit 44 may detect the termination of display based on the operation of the display control unit 32 and may, for example, detect the termination when the user 50 has watched the movie content through the end or interrupted the playback of the moving image content.

The adaptation display determination unit 46 determines an adaptation display pattern that defines a change in brightness of the image to be displayed on the display unit 22 after the termination is detected by the termination detection unit 44. The adaptation display pattern defines, for example, an initial value p of image brightness, a terminal value q of image brightness, and a display time t required for a change in brightness from the initial value p to the terminal value q.

The initial value p of the adaptation display pattern is determined based on the internal illuminance value at the point of time of termination detected by the termination detection unit 44. Specifically, the initial value p is determined so that the internal illuminance value occurring when the image having the brightness of the initial value p is displayed on the display unit 22 matches the internal illuminance value at the point of time of termination. That is, the initial value p matches the brightness of the image displayed on the display unit 22 at the point of time of termination.

The terminal value q of the adaptation display pattern is determined based on the external illuminance value at the point of time of termination detected by the termination detection unit 44. Specifically, the terminal value q is determined such that the internal illuminance value occurring when the image having the brightness of the terminal value q is displayed on the display unit 22 matches the external illuminance value at the point of time of termination.

The display time t of the adaptation display pattern is determined according to at least one of a plurality of conditions. The plurality of conditions include, for example, the age a of the user 50, the elapsed time b of display on the display unit 22, and the illuminance difference c between the internal illuminance value and the external illuminance value. When the age a is used, it is ensured, for example, that the higher the age of the user 50 acquired by the age acquisition unit 40, the longer the display time t of the adaptation display pattern. When the elapsed time b is used, it is ensured, for example, that the longer the elapsed time measured by the time measurement unit 42, the longer the display time t of the adaptation display pattern. When the illuminance difference c is used, it is ensured, for example, that the larger the illuminance difference between the internal illuminance value and the external illuminance value, the longer the display time t of the adaptation display pattern.

The adaptation display determination unit 46 can determine the display time t using a table or mathematical formula that defines the relationship between at least one of the plurality of conditions and the display time t. When a table is used, correspondence between the numerical range of at least one of the plurality of conditions and the display time t is defined. When a mathematical formula is used, an addition value $\alpha$, a multiplication value $\beta$, etc. corresponding to the numerical value or numerical range of at least one of the plurality of conditions are determined. It is also possible to combine tables and formulas arbitrarily.

FIG. 3 is a table showing an example of the display time t determined according to age a. In the example of FIG. 3, the age a is segmented into three ranges, and an addition value $\alpha_A$ added to the display time t is associated with each segment. Specifically, $\alpha_A=0$ seconds in the case of the first range (under 30 years old), $\alpha_A=5$ seconds in the case of the second range (30 years old or over and under 50 years old), and $\alpha_A=10$ seconds in the case of the third range (50 years old or over). The number of segments is not limited to three but may be two or four or more. Alternatively, a mathematical formula can be defined instead of a table. For example, the addition value $\alpha_A$ of the display time t may be defined as a function $f_A(a)$ of the age a such that $\alpha_A=f_A(a)$.

FIG. 4 is a table showing an example of the display time t determined according to the elapsed time b. In the example of FIG. 4, the elapsed time b is segmented into three ranges, and the addition value $\alpha_B$ of the display time t is associated with each segment. Specifically, $\alpha_B=0$ seconds in the case of the first range (less than 1 hour), $\alpha_B=5$ seconds in the case of the second range (equal to or more than 1 hour and less than 2 hours), and $\alpha_B=10$ seconds in the case of the third range (equal to or more than 2 hours). The number of segments is not limited to three but may be two or four or more. Alternatively, a mathematical formula can be defined instead of a table. For example, the addition value $\alpha_B$ of the display time t may be defined as a function $f_B(b)$ of the elapsed time b such that $\alpha_B = f_B(b)$.

FIG. 5 is a table showing an example of the display time t determined according to the illuminance difference c between the internal illuminance value and the external illuminance value. In the example of FIG. 5, the illuminance difference c is segmented into three ranges, and the multiplication value $\beta_C$ by which the display time t is multiplied is associated with each segment. Specifically, $\beta_C = 0.8$ in the case of the first range (less than the first reference value c1), $\beta_C = 1$ in the case of the second range (equal to or more than the first reference value c1 and less than the second reference value c2), and $\beta_C = 1.2$ in the case of the third range (equal to or more than the second reference value c2). The number of segments is not limited to three but may be two or four or more. Alternatively, a mathematical formula can be defined instead of a table. For example, the multiplication value $\beta_C$ of the display time t may be defined as a function $f_C(c)$ of the illuminance difference c such that $\beta_C = f_C(c)$.

When all tables shown in FIGS. 3 to 5 are used, the adaptation display determination unit 46 can determine the display time by the calculation formula $t = (\alpha_A + \alpha_B) \cdot \beta_C$. It is noted that the display time t can also be determined using only one or two of the plurality of conditions including the age a, elapsed time b, and illuminance difference c. Further, the display time t may be determined by arbitrarily combining the plurality of functions $f_A(a)$, $f_B(b)$, and $f_C(c)$ respectively defined for the plurality of conditions by addition or multiplication.

The adaptation display determination unit 46 may determine a time change rate $\Delta$ of brightness from the initial value p to the terminal value q and determine the display time t using the determined time change rate $\Delta$. It is noted that time change rate $\Delta$ of brightness is an amount of change per unit time di of the brightness L of the image displayed on the display unit 22 and can be given by $\Delta = dL/d\tau$. The time change rate $\Delta$ may be constant with respect to time $\tau$ or may be a function $\Delta(\tau)$ that changes with respect to time $\tau$. When the time change rate $\Delta$ is defined to be constant, the display time t can be calculated by the equation $t = |q-p|/\Delta$. In the case of the function $\Delta(\tau)$ having time $\tau$ as a variable, the display time t can be determined such that the amount of change in brightness $\int \Delta(\tau) d\tau$ derived from integrating the time change rate $\Delta(\tau)$ over the display time t is equal to the difference between the initial value p and the terminal value q (i.e., $\int \Delta(\tau) d\tau = q-p$). In the following, a case where the time change rate $\Delta$ is constant will be described, but the description can also be applied to a case where the function $\Delta(\tau)$ having time $\tau$ as a variable is used.

The adaptation display determination unit 46 can determine the time change rate $\Delta$ according to at least one of the age a or elapsed time b and can determine the time change rate $\Delta$ such that the larger each of the age a and elapsed time b is, the smaller the time change rate $\Delta$ is. The relationship between the age a or elapsed time b and the time change rate $\Delta$ may be determined by a table as shown in FIG. 3 or FIG. 4, or may be determined by a mathematical formula using an arbitrary function.

Figure 6A:
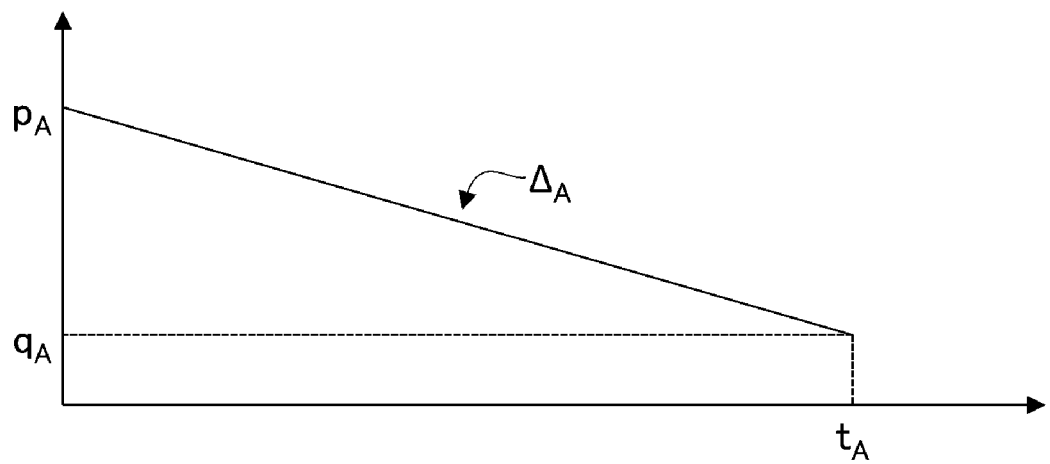
FIGS. 6A and 6B are diagrams schematically showing an example of an adaptation display pattern.
Figure 6B:
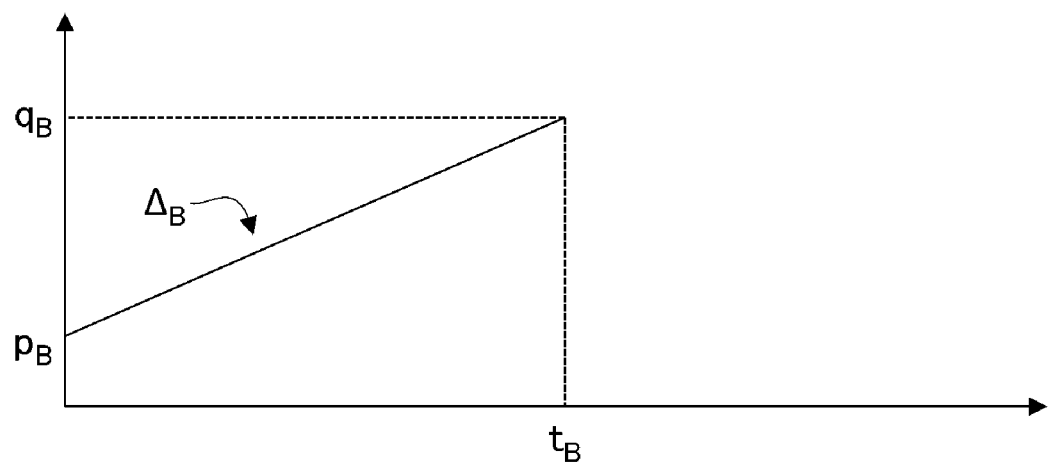

The adaptation display determination unit 46 may determine the display time t according to the relative magnitude of the internal illuminance value and the external illuminance value. In other words, the display time t may be determined according to the relative magnitude of the initial value p and the terminal value q. FIGS. 6A and 6B are diagrams schematically showing an example of an adaptation display pattern. FIG. 6A shows a case where the internal illuminance value is larger than the external illuminance value, and the initial value $p_A$ is larger than the terminal value $q_A$ (i.e., $p_A > q_A$). In this case, the user 50 is required to adapt to a change from bright to dark (i.e., dark adaptation). FIG. 6B shows a case where the internal illuminance value is smaller than the external illuminance value, and the initial value $p_B$ is smaller than the terminal value $q_B$ (i.e., $p_B < q_B$). In this case, the user 50 is required to adapt to a change from the dark to bright (i.e., light adaptation). It is said that dark adaptation generally takes longer than light adaptation. Therefore, the time change rate $\Delta A = (p_A - q_A)/t_A$ in the dark adaptation pattern of FIG. 6A is configured to be smaller than the time change rate $\Delta B = (q_B - p_B)/t_B$ in the light adaptation pattern of FIG. 6B. Thus, by configuring the time change rate of brightness in the dark adaptation pattern to be smaller than the time change rate of brightness in the light adaptation pattern, it is possible to determine an adaptation display pattern suited to each of dark adaptation and light adaptation.

When the termination is detected by the termination detection unit 44, the display control unit 32 displays an image according to the adaptation display pattern determined by the adaptation display determination unit 46. The display control unit 32 first displays an image having the initial brightness value p on the display unit 22, displays the image on the display unit 22 so that the brightness increases or decreases monotonically as time passes, and finally displays the image having the terminal brightness value q on the display unit 22.

Figure 7:
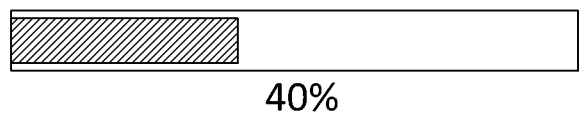
FIG. 7 is a diagram illustrating an example of an adaptation display image.

The display control unit 32 may show a message to have the user 50 to wait to pull off or wear the display apparatus 12. When the display control unit 32 displays an image according to the adaptation display pattern, the display control unit 32 may display, on the display unit 22, a message indicating that adaptation display is proceeding, a numeral indicating the status of progress of adaptation display, or a numeral indicating the time that remains until the adaptation display is completed. FIG. 7 is a diagram illustrating an example of an adaptation display image. In the example in FIG. 7, a message "adjusting to the brightness of the external environment. Please wait for a while." is displayed to indicate that adaptation display is proceeding, and a numeral "40%" and a progress bar indicating a status of progress that has taken place before the completion of adaptation display are displayed. The display control unit 32 causes the display unit 22 to display an image according to the adaptation display pattern by monotonically increasing or decreasing the overall brightness (or luminance) of the adaptation display image shown in FIG. 7.

Figure 8:
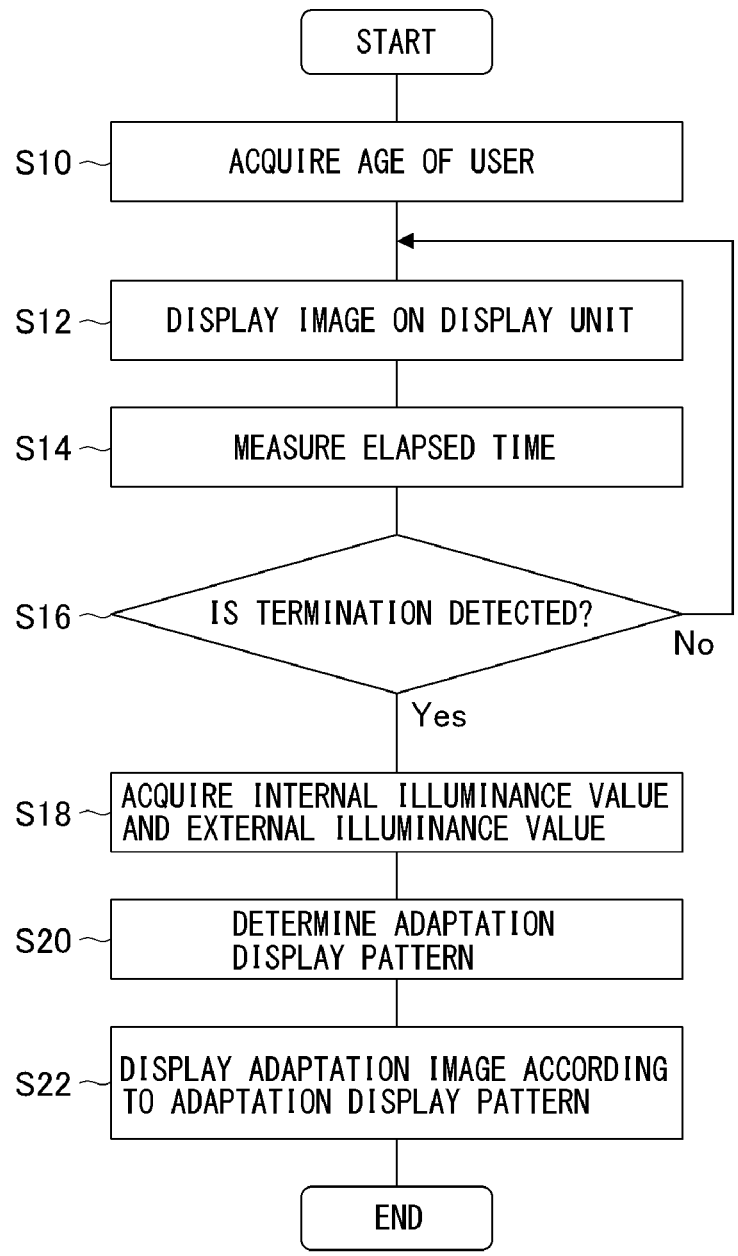
FIG. 8 is a flowchart showing a display method according to the embodiment.

FIG. 8 is a flowchart showing a display method according to the embodiment. The age acquisition unit 40 acquires the age of the user 50 (step S10). The display control unit 32 causes the display unit 22 to display an image (step S12), and the time measurement unit 42 measures the time elapsed from the start (step S14). When the termination detection unit 44 does not detect termination (No in step S16), the steps S12-S14 are continued. When the termination detection unit 44 detects termination (Yes in step S16), the illuminance acquisition unit 34 acquires the internal illuminance value and the external illuminance value (step S18), and the adaptation display determination unit 46 determines the adaptation display pattern based on the internal illuminance value and the external illuminance value (step S20). The adaptation display determination unit 46 may determine the adaptation display pattern according to the age of the user 50 or determine the adaptation display pattern according to the time elapsed from start to termination of display measured by the time measurement unit 42. The display control unit 32 causes the display unit 22 to display an adaptation display image in which the brightness changes according to the determined adaptation display pattern (step S22).

According to this embodiment, an abrupt change in brightness occurring when the use of the display apparatus 12 is removed is reduced by displaying, on the display unit 22, an adaptation display image in which the brightness changes so that the illuminance inside the housing 20 matches the illuminance outside, before the use of the display apparatus 12 is terminated and the display apparatus 12 is removed. Even if the difference between the brightness inside the display apparatus 12 and the brightness outside at the time of termination of use is large, the eyes of the user 50 can be gradually accustomed to the brightness of the external environment before the display apparatus 12 is removed so that the strain on the eyes of the user 50 can be reduced.

According to this embodiment, adaptation display more suited to the user 50 can be realized by adjusting the display time of the adaptation display pattern according to the age of the user 50. When the age of the user 50 is low, the time it takes to adapt to a change in brightness is relatively short. Therefore, it is possible, by reducing the display time of the adaptation display pattern, to shorten the waiting time required until the display apparatus 12 can be removed and to prevent a decrease in convenience. When the age of the user 50 is high, on the other hand, the time it takes to adapt to a change in brightness is relatively long. Therefore, it is possible, by increasing the display time of the adaptation display pattern, to reduce the strain on the eyes of the user 50 viewing the adaptation display image.

According to this embodiment, adaptation display more suited to the user 50 can be realized by adjusting the display time of the adaptation display pattern according to the hour of use of the display apparatus 12 by the user 50 (i.e., the time elapsed from the start of use). In a situation where the eye fatigue of the user 50 is considered to be heavy due to the long hour of use of the display apparatus 12, the strain on the user 50 viewing the adaptation display image can be reduced by increasing the display time of the adaptation display pattern. In a situation where the eye fatigue of the user 50 is not considered to be heavy due to the short hour of use of the display apparatus 12, on the other hand, it is possible, by reducing the display time of the adaptation display pattern, to shorten the waiting time required until the display apparatus 12 can be removed and to prevent a decrease in convenience.

According to this embodiment, adaptation display more suited to the user 50 can be realized by determining the time change rate of brightness of the adaptation display image in the adaptation display pattern according to the age of the user 50 and hour of use. When the difference between the brightness inside the display apparatus 12 and the brightness outside at the termination of use is small, the display time of the adaptation display pattern can be shortened by determining the display time based on the determined time change rate. Further, when the difference between the brightness inside the display apparatus 12 and the brightness outside at the termination of use is very large, it is possible, by using a fixed display time, to prevent the time change rate of the adaptation display pattern from becoming excessively large and prevent the strain on the eyes of the user 50 from becoming too heavy.

According to this embodiment, adaptation display more suited to the user 50 can be realized by configuring the time change rate of brightness of the image in the adaptation display pattern to be smaller when the internal illuminance value is larger than the external illuminance value than when the internal illuminance value is smaller than the external illuminance value. That is, it is possible, by configuring the time change rate of brightness to be smaller in the case of dark adaptation than in the case of bright adaptation and relatively increasing the display time, to prevent the strain on the eyes of the user 50 from becoming too heavy in the case of dark adaptation in which the time it takes for adaptation tends to be long.

Figure 9:
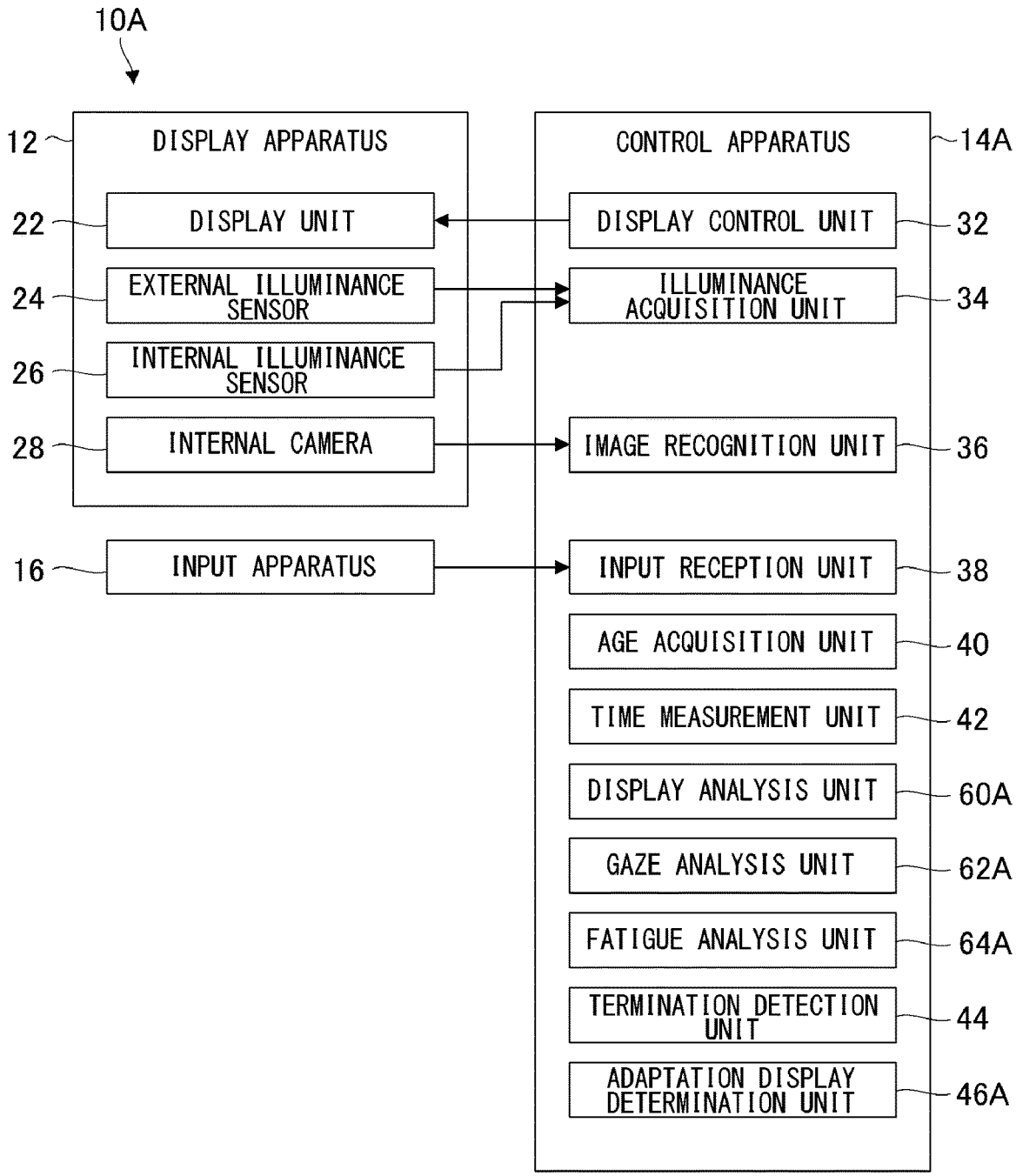
FIG. 9 is a block diagram schematically showing a functional configuration of a display system according to another embodiment.

FIG. 9 is a block diagram schematically showing a functional configuration of a display system 10A according to another embodiment. The display system 10A includes a display apparatus 12, a control apparatus 14A, and an input apparatus 16. The display apparatus 12 and the input apparatus 16 are configured in the same manner as in the embodiment described above. The control apparatus 14A differs from the above-described embodiment in that it further includes a display analysis unit 60A, a gaze analysis unit 62A, and a fatigue estimation unit 64A. Hereinafter, this embodiment will be described mainly highlighting the differences from the above-described embodiment, and a description of common features will be omitted as appropriate.

The control apparatus 14A includes a display control unit 32, an illuminance acquisition unit 34, an image recognition unit 36, an input reception unit 38, an age acquisition unit 40, a time measurement unit 42, a display analysis unit 60A, a gaze analysis unit 62A, a fatigue estimation unit 64A, a termination detection unit 44, and an adaptation display determination unit 46A. The display control unit 32, the illuminance acquisition unit 34, the image recognition unit 36, the input reception unit 38, the age acquisition unit 40, the time measurement unit 42, and the termination detection unit 44 are configured in the same manner as in the above-described embodiment.

The display analysis unit 60A analyzes the brightness of the image displayed on the display unit 22 and calculates a luminance score indicating whether the brightness of the image is appropriate. The display analysis unit 60A calculates, for example, an average value of the brightness of the image displayed on the display unit 22 in each predetermined time segment (e.g., 10 seconds or 1 minute) and calculates a segment score based on the average value. The display analysis unit 60A calculates a luminance score by averaging the calculated segment scores over the playback time of the moving image content. For example, the display analysis unit 60A outputs a low score (e.g., 1) when the average value of brightness in the time segment is within a predetermined range and the brightness of the image is appropriate, outputs a medium score (e.g., 3) when the average value is lower than the predetermined range and the image is too dark, and outputs a high score (e.g., 5) when the average value is higher than the predetermined range and the image is too bright. For example, given that segment scores in 5 segments are 1, 1, 3, 1, 5, the luminance score $S1=(1+1+3+1+5)/5=2.2$. When the average value is outside the predetermined range, the score may be changed according to the difference from the lower limit value or the upper limit value to the average value in the predetermined range. The larger the difference from the lower limit value or the upper limit value to the average value, the larger the score may be. That is, the more distanced the average value of brightness of the image from an appropriate range, the larger the segment score may be.

The gaze analysis unit 62A analyzes a change in the gaze direction of the user 50 and calculates a gaze change score indicating an amount of gaze movement. For example, the gaze analysis unit 62A acquires the gaze direction or gaze position of the user 50 estimated by the image recognition unit 36 in each predetermined time segment (e.g., 0.1 seconds or 1 second) and calculates a change amount or movement amount from the gaze direction or gaze position acquired immediately before. The gaze analysis unit 62A calculates a gaze change score by integrating the calculated change amount or movement amount over the playback time of the moving image content. For example, the gaze analysis unit 62A outputs a low score (e.g., 1) when the amount of gaze movement is less than the first reference value, outputs a medium score (e.g., 3) when the amount of gaze movement is equal to or more than the first reference value and less than the second reference value, and outputs a high score (e.g., 5) if the amount of gaze movement is equal to or more than the second reference value. The score may be changed continuously according to the amount of gaze movement, and the larger the amount of gaze movement, the larger the score may be.

The fatigue estimation unit 64A estimates the fatigue level of the user 50 based on at least one of the luminance score S1 calculated by the display analysis unit 60A or the gaze change score S2 calculated by the gaze analysis unit 62A. The fatigue estimation unit 64A calculates the fatigue level such that the larger the luminance score S1, the higher the fatigue level and the larger the gaze change score S2, the higher the fatigue level. The fatigue estimation unit 64A may calculate the fatigue level score S3=S1+S2 by simply adding the luminance score S1 and the gaze change score S2. The fatigue estimation unit 64A may calculate a weighted average of the luminance score S1 and the gaze change score S2 using a predetermined weighting coefficient k (0<k<1) to calculate the fatigue level score S3=k·S1+(1−k)/S2.

The fatigue estimation unit 64A may not calculate the fatigue level over the entire playback time (for example, 1 hour or 2 hours) of the moving image content but may calculate the fatigue level over a relatively short predetermined time (for example, 5 minutes or 10 minutes) in the immediate past. The fatigue estimation unit 64A may calculate the fatigue level score S3 using the luminance score S1 in a predetermined period of time in the immediate past calculated by the display analysis unit 60A. Similarly, the fatigue estimation unit 64A may calculate the fatigue level score S3 using the gaze change score S2 in a predetermined period of time in the immediate past calculated by the gaze analysis unit 62A.

When calculating the fatigue level in the predetermined period of time in the immediate past, the fatigue estimation unit 64A may calculate and store the fatigue level score S3 in each predetermined time segment during the playback of the moving image content. After the termination detection unit 44 detects the termination of use of the display apparatus 12, the fatigue estimation unit 64A may calculate the fatigue level score S3 by averaging the fatigue level scores in respective predetermined time segments in a relatively short predetermined period of time (for example, 5 minutes or 10 minutes) before the termination.

The fatigue estimation unit 64A may adjust the fatigue level score S3 according to the age a of the user 50 acquired by the age acquisition unit 40. The fatigue estimation unit 64A may add, for example, an addition value $\alpha_{SA}$ determined according to the age a to the fatigue level score S3. Like the addition value $\alpha_A$ described above, the addition value $\alpha_{SA}$ can be set such that the higher the age, the larger the value. The fatigue estimation unit 64A may multiply a multiplication value $\beta_{SA}$ determined according to the age a by the fatigue level score S3. The multiplication value $\beta_{SA}$ determined according to the age a can be set such that the higher the age a, the larger the value.

The fatigue estimation unit 64A may adjust the fatigue level score S3 according to the elapsed time b acquired by the time measurement unit 42. The fatigue estimation unit 64A may add, for example, an addition value $\alpha_{SB}$ determined according to the elapsed time b to the fatigue level score S3. Like the addition value $\alpha_B$ described above, the addition value $\alpha_{SB}$ can be set such that the longer the elapsed time b, the larger the value. The fatigue estimation unit 64A may multiply a multiplication value $\beta_{SB}$ determined according to the elapsed time b by the fatigue level score S3. The multiplication value $\beta_{SB}$ determined according to the elapsed time b can be set such that the longer the elapsed time b, the larger the value.

The adaptation display determination unit 46A determines an adaptation display pattern that defines a change in the brightness of the image displayed on the display unit 22 after the termination detection by the termination detection unit 44. The adaptation display pattern defines, for example, an initial value p of image brightness, a terminal value q of image brightness, and a display time t required for a change in brightness from the initial value p to the terminal value q. The adaptation display determination unit 46A can determine the initial value p and the termination value q in the same manner as the adaptation display determination unit 46 according to the above-described embodiment.

The adaptation display determination unit 46A determines the adaptation display pattern according to the fatigue level estimated by the fatigue estimation unit 64A. The adaptation display determination unit 46A determines the display time t or the time change rate Δ in the adaptation display pattern according to the fatigue level score S3 calculated by the fatigue estimation unit 64A. For example, the adaptation display determination unit 46A ensures that the higher the fatigue level score S3, the longer the display time t or the smaller the time change rate Δ. The relationship between the fatigue level score S3 and the display time t or the time change rate Δ may be determined by a table or by a mathematical formula using an arbitrary function.

Figure 10:
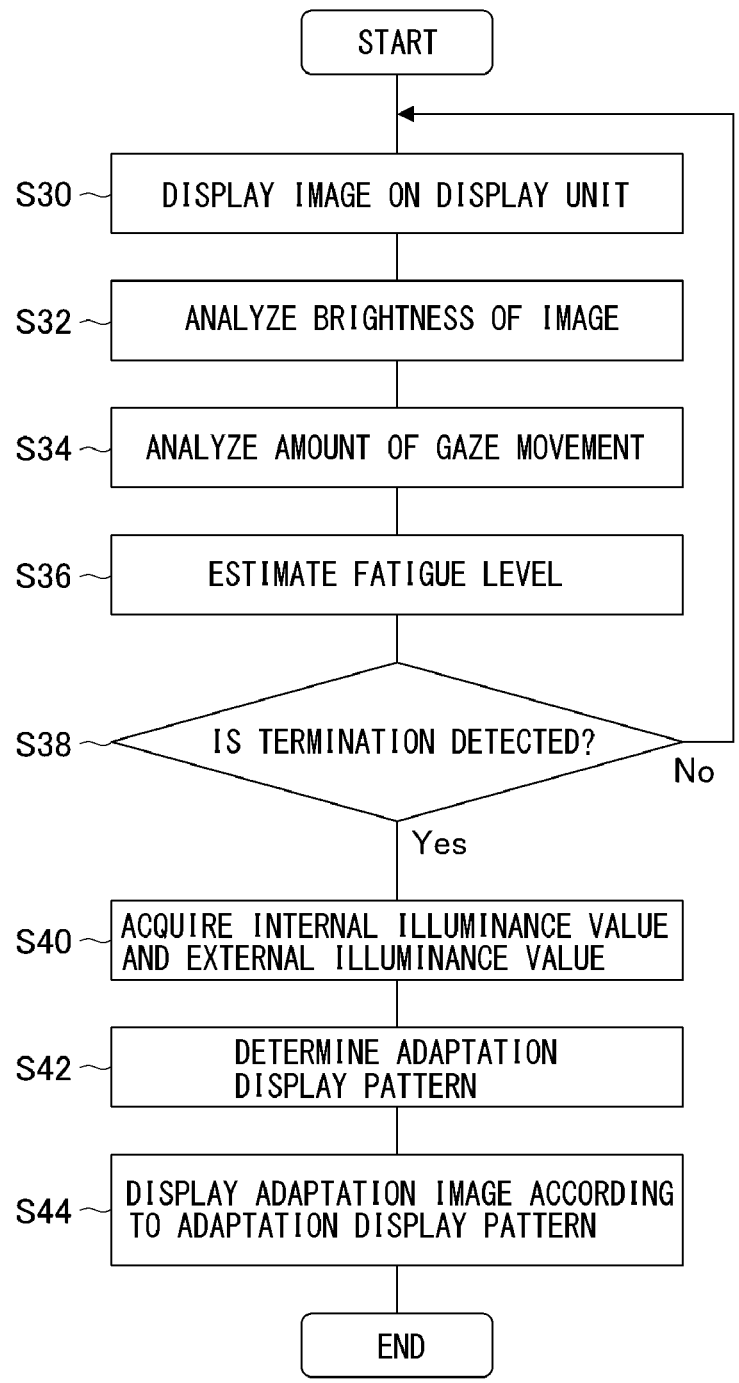
FIG. 10 is a flowchart showing a display method according to another embodiment.

FIG. 10 is a flowchart showing a display method according to another embodiment. The display control unit 32 causes the display unit 22 to display an image (step S30). The display analysis unit 60A analyzes the brightness of the image displayed on the display unit 22 based on the operation of the display control unit 32 (step S32). The gaze analysis unit 62A analyzes the amount of gaze movement based on the gaze direction of the user 50 recognized by the image recognition unit 36 (step S34). The fatigue estimation unit 64A estimates the fatigue level of the user 50 based on the analysis result of at least one of the display analysis unit 60A or the gaze analysis unit 62A (step S36). When the termination detection unit 44 does not detect the termination (No in step S38), the steps S30-S36 are continued. When the termination detection unit 44 detects the termination (Yes in step S38), the illuminance acquisition unit 34 acquires an internal illuminance value and an external illuminance value (step S40). The adaptation display determination unit 46A determines the adaptation display pattern based on the acquired internal illuminance value and external illuminance value and the estimated fatigue level (step S42). The display control unit 32 causes the display unit 22 to display an adaptation display image in which the brightness changes according to the determined adaptation display pattern (step S44).

According to this embodiment, adaptation display more suited to the user 50 can be realized by estimating the fatigue level of the user 50 attributable to the use of the display apparatus 12 by the user 50 and adjusting the display time of the adaptation display pattern according to the fatigue level. In a situation where the luminance score S1 is high because the image displayed on the display unit 22 is too dark or too bright so that the eye fatigue of the user 50 is considered to be heavy, the strain on the user 50 viewing the adaptation display image can be reduced by extending the display time of the adaptation display pattern. Further, in a situation where the gaze change score S2 is high due to a large movement of the moving image content so that the eye fatigue of the user 50 is considered to be heavy, the strain on the user 50 viewing the adaptation display image can be reduced by extending the display time of the adaptation display pattern. In a situation where the fatigue level score S3 is low and the eye fatigue of the user 50 is not considered to be heavy, on the other hand, it is possible, by reducing the display time of the adaptation display pattern, to shorten the waiting time required until the display apparatus 12 can be removed and to prevent a decrease in convenience.

When an image is generated based on moving image data for playing back moving image content, the gaze analysis unit 62A may calculate a gaze change score indicating the amount of gaze movement based on the motion vector included in the moving image data. That is, the gaze analysis unit 62A calculates the score such that the larger the magnitude of the motion vector, the larger the gaze change score. The gaze analysis unit 62A may calculate the score such that the larger the amount of motion vector data included in the moving image data, the larger the gaze change score. The gaze analysis unit 62A estimates, for example, that the movement of the moving image content is small when the movement of an object in the moving image is small or a change between moving image frames is small in the moving image content. When the gaze analysis unit 62A estimates that the movement of the moving image content is small, the gaze analysis unit 62A calculates the gaze change score S2 lower than a predetermined value. The gaze analysis unit 62A estimates, for example, that the movement of the moving image content is large when the movement of an object in the moving image is large or a change between moving image frames is large. When it is estimated that the movement of the moving image content is large, the fatigue estimation unit 64A calculates the gaze change score S2 higher than a predetermined value. In this case, the image recognition unit 36 may not estimate the gaze direction of the user 50. Further, the display apparatus 12 may not include the internal camera 28, and the control apparatus 14A may not include the image recognition unit 36.

The fatigue estimation unit 64A may estimate the fatigue level of the user 50 based on biological information of the user 50 acquired by a biometric sensor instead of the fatigue level of the eyes of the user 50. The fatigue estimation unit 64A may estimate the fatigue level of the user 50 based on operation information indicating an operation performed by the user 50 in the virtual space. For example, the fatigue estimation unit 64A may estimate the fatigue level according to a movement distance of the user 50 in the virtual space or an amount of movement of the user's own body (head, arm, trunk, leg, etc.). The fatigue estimation unit 64A may identify a fatigued biological part of the user 50 based on the biological information or operation information on the user 50, change the adaptation display pattern according to the fatigued biological part of the user 50, or change the image displayed on the display unit 22.

The invention has been explained with reference to the embodiments described above, but the invention is not limited to the embodiments described above, and appropriate combinations or replacements of the features shown in the examples presented are also encompassed by the present invention.

Some modes of the present invention will be described.

A first mode of the present invention relates to a display system including: a display unit that is provided inside a housing mounted on a user's head and that displays an image to the user; a time measurement unit that measures an elapsed time from start of display by the display unit; a termination detection unit that detects termination of display by the display unit; and an adaptation display determination unit that determines, according to the elapsed time from start to end of display by the display unit, an adaptation display pattern that reduces a difference between an internal illuminance value indicating a brightness inside the housing and an external illuminance value indicating a brightness outside the housing by changing a brightness of the image displayed on the display unit.

In the first mode, the adaptation display determination unit may determine the adaptation display pattern further according to an age of the user.

In the first mode, the adaptation display determination unit may determine the time change rate of brightness in the adaptation display pattern according to at least one of the elapsed time or age of the user.

In the first mode, the adaptation display determination unit may configure the time change rate of brightness in the adaptation display pattern to be smaller when the internal illuminance value is larger than the external illuminance value than when the internal illuminance value is smaller than the external illuminance value.

The first mode may be provided as a display method. The method may include: displaying an image on a display unit provided inside a housing mounted on a user's head; measuring an elapsed time from start of display by the display unit; detecting termination of display by the display unit; determining, according to the elapsed time from start to end of display by the display unit, an adaptation display pattern that reduces a difference between an internal illuminance value indicating a brightness inside the housing and an external illuminance value indicating a brightness outside the housing by changing a brightness of the image displayed on the display unit.

The first mode may be provided as a program or a non-transitory recording medium encoded with a program. The program includes computer-implemented modules including: a module that displays an image on a display unit provided inside a housing mounted on a user's head; a module that measures an elapsed time from start of display by the display unit; a module that detects termination of display by the display unit; and a module that determines, according to the elapsed time from start to end of display by the display unit, an adaptation display pattern that reduces a difference between an internal illuminance value indicating a brightness inside the housing and an external illuminance value indicating a brightness outside the housing by changing a brightness of the image displayed on the display unit.

A second mode of the present invention relates to a display system including: a display unit that is provided inside a housing mounted on a user's head and that displays an image to the user; a fatigue estimation unit that estimates a fatigue level of the user; a termination detection unit that detects termination of display by the display unit; and an adaptation display determination unit that determines, according to the fatigue level estimated by the fatigue estimation unit, an adaptation display pattern that reduces a difference between an internal illuminance value indicating a brightness inside the housing and an external illuminance value indicating a brightness outside the housing by changing a brightness of the image displayed on the display unit over time.

In the second mode, the fatigue estimation unit may estimate the fatigue level of the user based on a brightness of the image displayed on the display unit.

In the second mode, the fatigue estimation unit may estimate the fatigue level of the user based on a movement of a content included in the image displayed on the display unit.

In the second mode, the fatigue estimation unit may estimate the fatigue level of the user based on at least one of an age of the user and an elapsed time from start to termination of display by the display unit.

The second mode may be provided as a display method. The method may include: displaying an image on a display unit provided inside a housing mounted on a user's head; estimating a fatigue level of the user; detecting termination of display by the display unit; determining, according to the fatigue level estimated, an adaptation display pattern that reduces a difference between an internal illuminance value indicating a brightness inside the housing and an external illuminance value indicating a brightness outside the housing by changing a brightness of the image displayed on the display unit.

The second mode may be provided as a program or a non-transitory recording medium encoded with a program. The program includes computer-implemented modules including: a module that displays an image on a display unit provided inside a housing mounted on a user's head; a module that estimates a fatigue level of the user; a module that detects termination of display by the display unit; and a module that determines, according to the fatigue level estimated, an adaptation display pattern that reduces a difference between an internal illuminance value indicating a brightness inside the housing and an external illuminance value indicating a brightness outside the housing by changing a brightness of the image displayed on the display unit.

What is claimed is:

1. A display system comprising:
   a display unit that is provided inside a housing mounted on a user's head and that displays an image to the user; and
   a processor, wherein
   the processor detects termination of display by the display unit,
   the processor determines an adaptation display pattern that reduces a difference between an internal illuminance value indicating a brightness inside the housing and an external illumination value indicating a brightness outside the housing by changing a brightness of the image displayed on the display unit,
   the processor calculates an increased display time of the adaptation display pattern corresponding to a larger illuminance difference between the internal illuminance value and the external illuminance value, and
   wherein the processor determines a time change rate of brightness in the adaptation display pattern to be smaller when the internal illuminance value is larger than the external illuminance value as compared to when the internal illuminance value is smaller than the external illuminance value, such that for illuminance differences of identical magnitude, the processor calculates an increased display time of the adaptation display pattern when the internal illuminance value is larger than the external illuminance value as compared when the internal illuminance value is smaller than the external illuminance value.

2. The display system according to claim 1, wherein
   the processor measures an elapsed time from start of display by the display unit, and
   the processor determines the adaptation display pattern according to the elapsed time.

3. The display system according to claim 1, wherein
   the processor determines the adaptation display pattern further according to an age of the user.

4. The display system according to claim 2, wherein
   the processor determines the time change rate of brightness in the adaptation display pattern according to at least one of the elapsed time and an age of the user.

5. The display system according to claim 1, wherein that the processor estimates a fatigue level of the user, and
   the processor determines the adaptation display pattern according to the fatigue level estimated by the fatigue estimation unit.

6. The display system according to claim 5, wherein
   the processor estimates the fatigue level of the user based on a brightness of the image displayed on the display unit.

7. The display system according to claim 5, wherein
   the processor estimates the fatigue level of the user based on a movement of a content included in the image displayed on the display unit.

8. The display system according to claim 5, wherein
   the processor estimates the fatigue level of the user based on at least one of an age of the user and an elapsed time from start to termination of display by the display unit.

9. A display method comprising:
   displaying an image in a display unit provided inside a housing mounted on a user's head;
   detecting termination of display by the display unit;
   determining an adaptation display pattern that reduces a difference between an internal illuminance value indicating a brightness inside the housing and an external illuminance value indicating a brightness outside the housing by changing a brightness of the image displayed on the display unit;
   calculating an increased display time of the adaptation display pattern corresponding to a larger illuminance difference between the internal illuminance value and the external illuminance value, and
   determining a time change rate of brightness in the adaptation display pattern to be smaller when the internal illuminance value is larger than the external illuminance value as compared to when the internal illuminance value is smaller than the external illuminance value, such that for illuminance differences of identical magnitude, calculating an increased display time of the adaptation display pattern when the internal illuminance value is larger than the external illuminance value as compared when the internal illuminance value is smaller than the external illuminance value.

10. A non-transitory recording medium encoded with a program, the program comprising computer-implemented modules including:

a module that displays an image on a display unit provided inside a housing mounted on a user's head;

a module that detects termination of display by the display unit;

a module that determines an adaptation display pattern that reduces a difference between an internal illuminance value indicating a brightness inside the housing and an external illuminance value indicating a brightness outside the housing by changing a brightness of the image displayed on the display unit;

a module that calculates an increased display time of the adaptation display pattern corresponding to a larger illuminance difference between the internal illuminance value and the external illuminance value, and a module that determines a time change rate of brightness in the adaptation display pattern to be smaller when the internal illuminance value is larger than the external illuminance value as compared to when the internal illuminance value is smaller than the external illuminance value, such that for illuminance differences of identical magnitude, calculates an increased display time of the adaptation display pattern when the internal illuminance value is larger than the external illuminance value as compared when the internal illuminance value is smaller than the external illuminance value.

* * * * *